United States Patent [19]
Kamin, Jr.

[11] Patent Number: 5,940,445
[45] Date of Patent: Aug. 17, 1999

[54] METHOD AND APPARATUS FOR PROVIDING TRANSMIT DIVERSITY IN A WIRELESS COMMUNICATION SYSTEM

[75] Inventor: Ralph A. Kamin, Jr., Bedford, Tex.

[73] Assignee: Motorola, Inc., Schaumburg, Ill.

[21] Appl. No.: 08/657,925

[22] Filed: May 31, 1996

[51] Int. Cl.⁶ .................................. H04B 7/02; H04L 1/02
[52] U.S. Cl. ........................... 375/267; 455/101; 342/196
[58] Field of Search .................................... 375/267, 295, 375/364; 455/132, 101; 342/196; 364/576, 726, 827; 370/320, 335

[56] References Cited

U.S. PATENT DOCUMENTS

| | | | |
|---|---|---|---|
| 3,984,634 | 10/1976 | Painter | 375/347 |
| 5,005,189 | 4/1991 | Hackett, Jr. | 375/347 |
| 5,533,011 | 7/1996 | Dean et al. | 375/267 |
| 5,550,872 | 8/1996 | Liberti, Jr. | 375/347 |
| 5,584,057 | 12/1996 | Dent | 455/101 |

*Primary Examiner*—Chi H. Pham
*Assistant Examiner*—Bryan Webster
*Attorney, Agent, or Firm*—Bruce Terry

[57] ABSTRACT

The wireless communication system transmits signals using radios (205). The radios (205) receive a signal which is formatted for transmission (602). The formatted signals from the radios (205) are divided. One formatted signal is input directly to a transform matrix (207) and a copy of the formatted signal is input to a delay (206) before being input to the transform matrix (207). Transform matrix (207) transforms (604) the input signals into output signals that each contain a portion of the input signals. The outputs from the transform matrix (207) are then amplified (605) using the amplifiers (208). The outputs from the amplifiers (208) are inverse transformed (606) in an inverse transform matrix (209). The inverse transform matrix (209) serves to recombine the portions of the signals originally input to the transform matrix (207). The resulting signals are then transmitted using antennas (210).

20 Claims, 4 Drawing Sheets

METHOD AND APPARATUS FOR PROVIDING TRANSMIT DIVERSITY IN A WIRELESS COMMUNICATION SYSTEM

FIELD OF THE INVENTION

The present invention relates, in general, to communication systems and, more particularly, to a method and apparatus for providing transmit diversity in a wireless communication system.

BACKGROUND OF THE INVENTION

Presently, in wireless communications systems, such as a Code Division Multiple Access (CDMA) cellular communication system, a design such as that shown in FIG. 1 is used. In FIG. 1, the infrastructure side (100) of a communication system is illustrated. This infrastructure design is shown in a three sector configuration. Each sector 101 consists of one or more radio channel units 102. The signal to be transmitted is output from radio channel units 102 to amplifiers 103. When more than one radio channel unit 102 is present, the outputs from amplifiers 103 are fed to combiner 104 The output from combiner 104 is then transmitted using antenna 105. This would be replicated for each of sectors 101.

In CDMA systems the signal transmitted from antenna 105 will be received by a receiver (not shown). During transmission, the signal will be reflected off of various objects (buildings, bridges, etc.) before arriving at the receiver. This creates the multi-path phenomena. The receiver is designed to take the multi-path signals and use them to recover the best estimate of the originally transmitted signal. The benefit in receiving several copies of the same signal is that something that caused interference with a portion of one signal would have a longer statistical probability of interfering with the same portion of a multi-path copy of the signal. The receiver uses the multiple copies of the signal received to reconstruct a single higher quality signal.

A related advantage is that the power of each of the various received multi-path signals is combined to provide a signal for processing that has a power level higher than, and therefore easier to decode, any one single copy of the signal.

This use of multi-path signals in processing a received signal has disadvantages in many rural applications. In rural areas, the obstructions that cause multi-path reflections are not available. In these cases, only one copy of the signal is received. If the signal was interfered with, the ability of the receiver to recover the correct signal is greatly reduced. This same problem also arises in applications which have smaller cell sizes (often referred to as microcells). In microcells, while there may be strict multi-path fading, the size of the cell is so small that each of the multi-path signals arrive too close together to derive the benefits of receiving multi-path signals. The lack of effective multi-path signals can result in a loss of sensitivity of 6–10 dB (decibler).

It has been found that delays in the multi-path signals of approximately one chip or more are needed for the receiver to be able to utilize the advantages of receiving multi-path copies of the transmitted signal. A "chip" delay refers to the chip rate of the transmitter of a CDMA signal. The signal to be transmitted is spread using orthogonal spreading codes in a semiconductor chip that has a processing rate. The term "chip" rate has been used to refer to this spreading rate.

One way to artificially generate multiple copies of a signal is to use multiple antennas which are spatially separated. Since any fading is independent on each signal path, this technique is useful in environments where fading is possible. However, this increases the complexity and cost of a system by having redundant transmissions.

It is also possible to compensate for the loss of multi-path signals by increasing the power of the transmitter. However, this would be contrary to the ongoing efforts in wireless communications to reduce the amount of power being used to transmit a signal in order to provide additional capacity such that more signals may be transmitted.

Therefore, a problem exists in present communication designs that results in less accurate processing of received signals in many proposed applications.

DETAILED DESCRIPTION OF THE DRAWINGS

Figure 2:
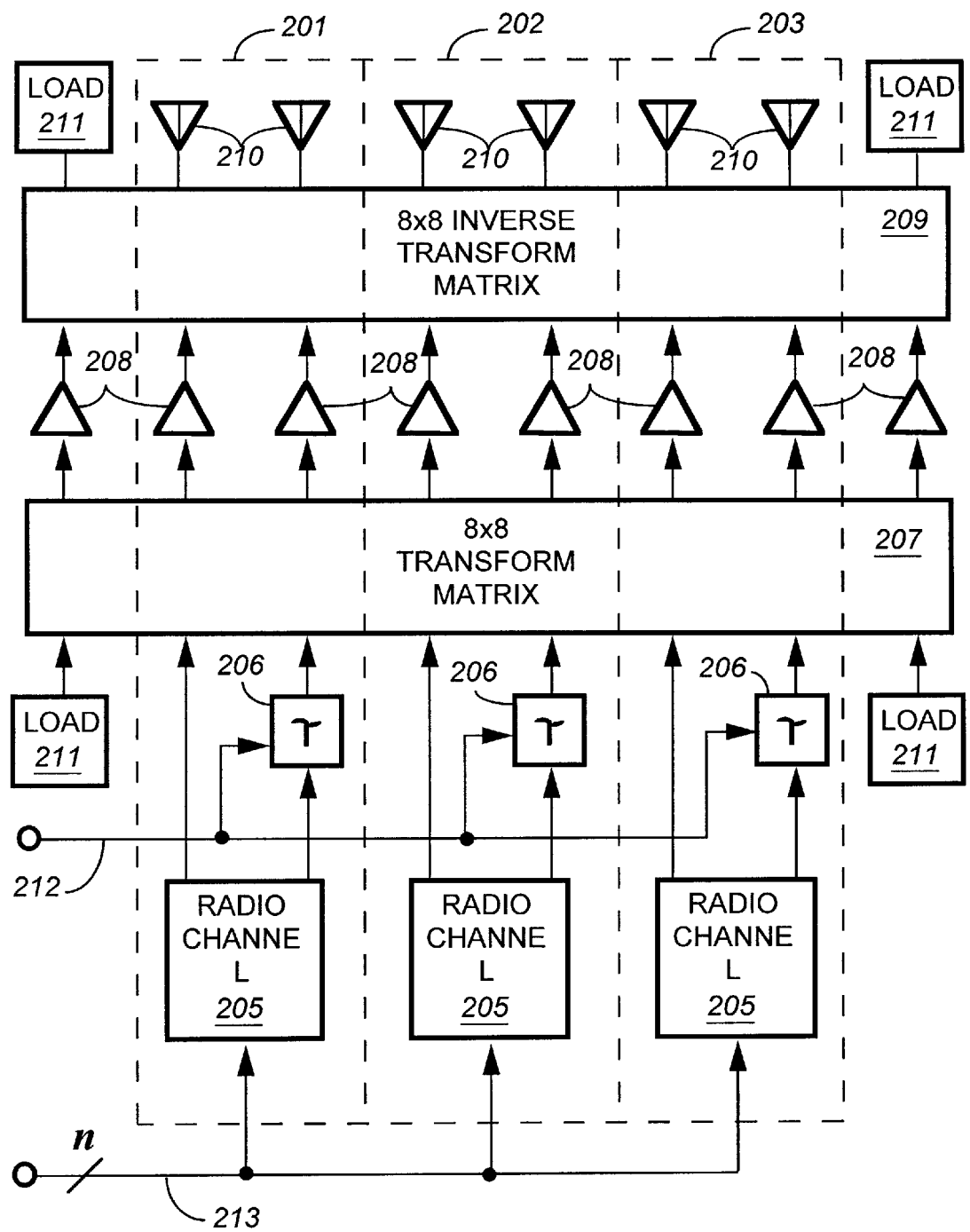
FIG. 2 is a block diagram of a first embodiment of an infrastructure system designed to utilize the present invention.

Referring initially to FIG. 2, a block diagram of a first embodiment of an infrastructure system, generally designated 200, designed to utilize the present invention is illustrated. Infrastructure system 200 is illustrated as a three sector (201–203) design with transmit diversity. Each sector 201–203 consists of at least one transmitting means, such as radio channel unit 205, each having two outputs; with one of the outputs being coupled to a delay 206. The signals are processed through a statistical averaging device such as transforming means (e.g. transform matrix 207), amplifiers 208, and inverse transform matrix 209 before being transmitted from antennas 210.

In operation, a signal to be transmitted arrives at one or more radio channel units 205 over bus 213. Radios 205 prepare the signal for transmission by performing the required modulation, coding, interleaving, etc. The resulting signal to be transmitted is then output to a first portion of the inputs of transform matrix 207 and to a radio frequency (RF) delay means 206 for delaying an RF representation of the signal. Transform matrix 207 would preferably be a Fourier Transform Matrix (FTM) matrix or a Butler transform matrix. Delay 206 will be used to add the desired amount of delay. In this embodiment, a one chip delay is used. Delays 206 are shown having a control input from control line 212. This control input can be used to adjust the amount of delay added to improve performance of the system as needed. The output from each delay 206 is then input to a second portion of the inputs of transform matrix 207.

In this embodiment, an 8×8 transform matrix 207 is illustrated having the first and eighth inputs coupled to loads 211. However, it should be noted that, since only six inputs are needed, the inputs used could be any six of the eight inputs with the two remaining inputs coupled to an appropriate load 211. An example of a transform matrix is described in W. A. Sandrin, "The Butler matrix transponder", Comsat Technical Review, vol. 4, no. 2 (Fall 1974). In matrix 207, each of the signals input at the eight inputs is divided equally by the number of inputs. These are then combined with a portion of each signal input to matrix 207 to provide modified signals at each of the outputs from matrix 207. In this particular embodiment, each modified signal contains one-eighth of the signals input to matrix 207. The result is that matrix 207 performs a statistical average of the input signals. This average serves to reduce the peak value of the higher signals input to matrix 207.

Figure 1:
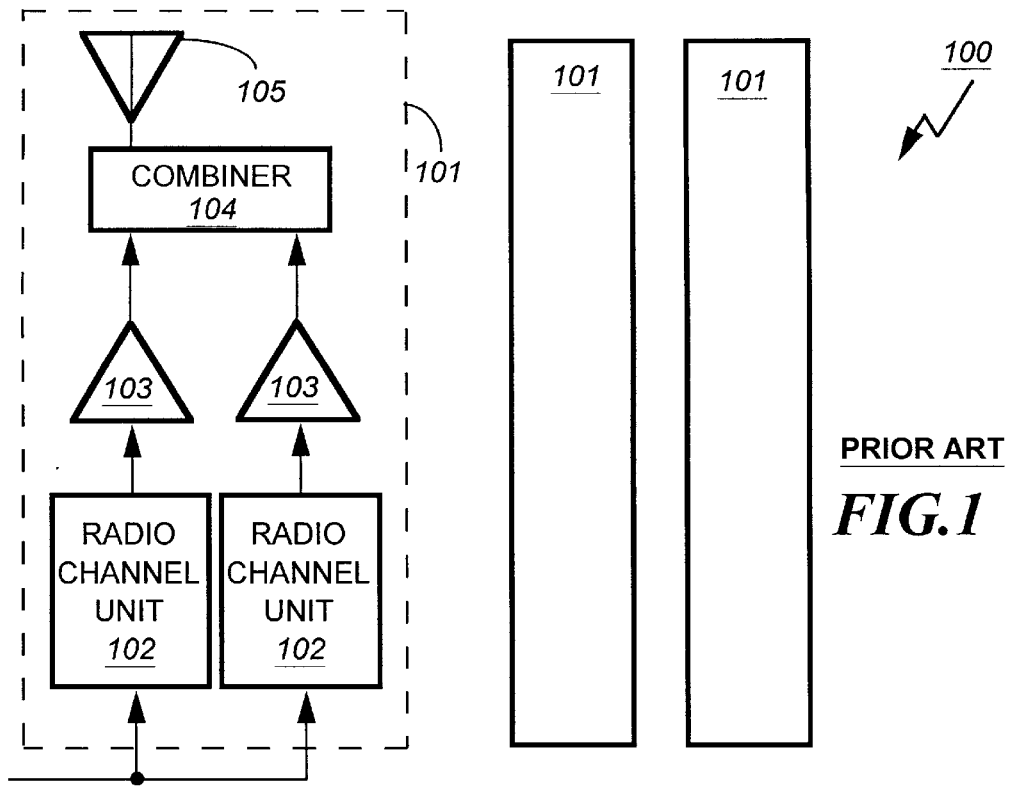
FIG. 1 is a block diagram of a prior art infrastructure system used for wireless communication.

Each of the outputs of transform matrix 207 is input to amplifying means 208 which, in one example, would be single tone amplifiers. By using the statistical average of the signals, smaller, lower power, and less expensive power amplifiers 208 may be utilized. The outputs from power amplifiers 208 are then input to an inverse statistical averaging device such as inverse transform matrix 209 (e.g. an inverse Fourier Transform Matrix or a inverse Butler Transform Matrix). In inverse transform matrix 209, the signals are again divided and combined to form the original signals. The result is that a signal having the same power level is present at the output of inverse transform matrix 209 as is present at the output of power amplifiers 103 of FIG. 1, but with amplifiers that require a lower peak power rating.

In this embodiment, six of the eight outputs are coupled to antennas 210. The remaining two outputs are coupled to loads 211. The two antennas 210 within sector 201 transmit the signal and delayed signal from radio 205. This provides, at a receiver, two signals separated in time by a sufficient amount to perform multi-path processing. In addition, this configuration provides the advantage of being able to compensate for the loss of a power amplifier. If one of the power amplifiers is lost, then only one-eighth of the power of each signal will be lost, rather than losing an entire signal as in the prior art configurations.

As will be understood by those of skill in the art, if transmit diversity is not desired, then additional radio units can be added to system 200. The additional radio units would provide inputs to transform matrix 207 which are currently provided by delays 206. This will enable the use of a six sector configuration instead of three sectors.

Figure 3:
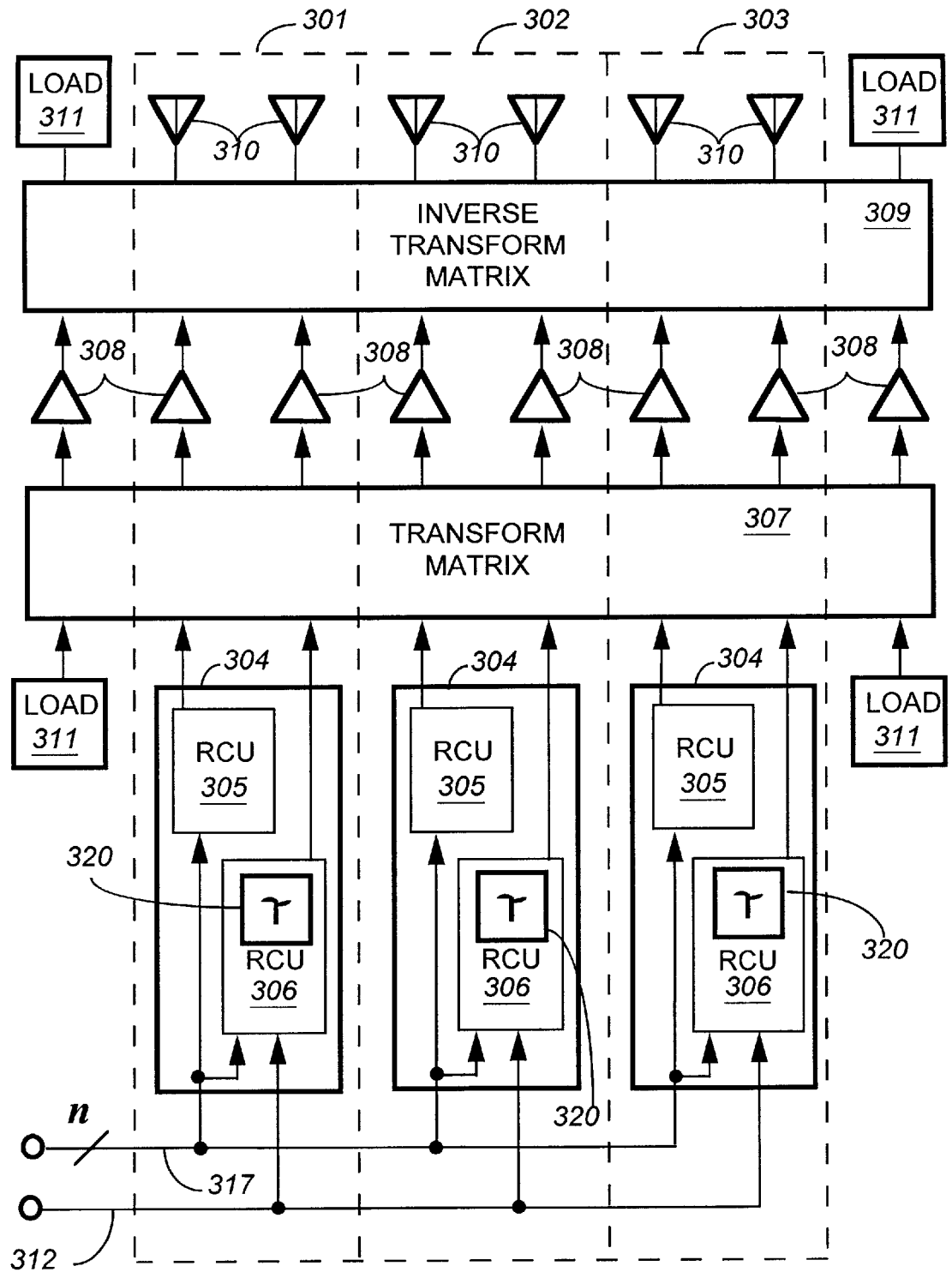
FIG. 3 is a block diagram of a second embodiment of an infrastructure system designed to utilize the present invention.

Referring now to FIG. 3, a block diagram of a second embodiment of an infrastructure system, generally designated 300, is illustrated. Infrastructure system 300 is also illustrated as a three sector (301–303) design with transmit diversity. Each sector 301–303 consists of at least two radio channel units 305 and 306. Radio 305 outputs a signal to be transmitted and radio 306 outputs the same signal delayed by, preferably, one chip time. The delay through radio 306 is caused by a digital delay means 320 for delaying a digital representation of the signal. The signals are then processed through a transform matrix 307, amplifiers 308, and inverse transform matrix 309 before being transmitted from antennas 310.

In operation, a signal to be transmitted arrives at radio channel units 305 and 306 over bus 313. Radios 305 and 306 prepare the signal for transmission by performing the required modulation, coding, interleaving, etc. The resulting signals are then output to transform matrix 307. Radios 306 are shown having a control input from control line 312. This control input can be used to adjust the amount of delay used.

In this embodiment, an 8×8 transform matrix 307 is also illustrated. Again, the first and eighth inputs are illustrated as having loads 311 coupled thereto, but these loads may be coupled to any two of the inputs. In matrix 307, each of the signals input at the eight inputs is divided equally by the number of inputs and combined with a portion of each signal input to matrix 307.

Each of the outputs of transform matrix 307 is input to an amplifying means 308, such as single tone power amplifiers. As with system 300, using the statistical average of the signals allows the use of, smaller, lower power, less expensive power amplifiers 308. The outputs from power amplifiers 308 are then input to inverse transform matrix 309 where the signals are again divided and combined to form the original signals input to transform matrix 307.

Six of the eight outputs are coupled to antennas 310. The remaining two outputs are coupled to loads 311. The two antennas 310 within sector 301 transmit the signal and delayed signal from radios 305 and 306, respectively. This then provides, at a receiver, two signals separated in time by a sufficient amount to perform multi-path processing.

Figure 4:
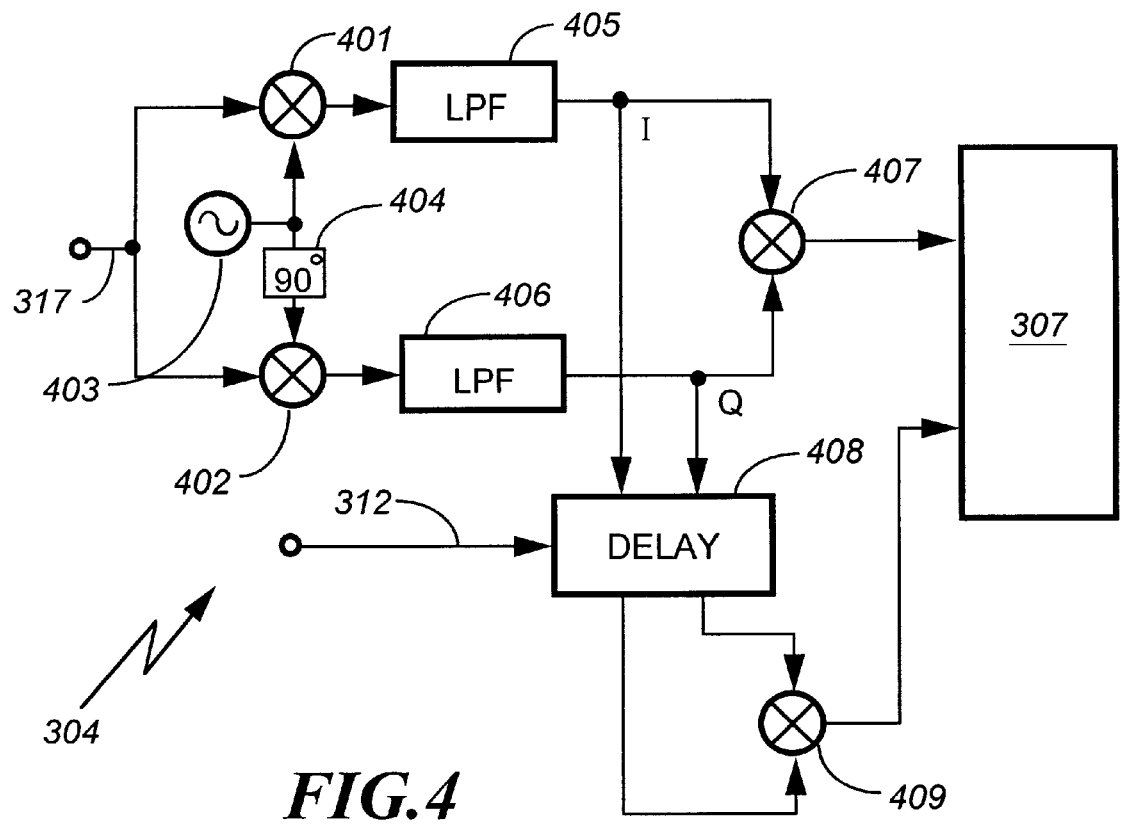
FIG. 4 is a block diagram of a radio channel unit of FIG. 3.

In FIG. 4, a block diagram of radio 304 used in FIG. 3 is illustrated. Radio 304 receives an input signal to be transmitted along bus 317. The signal is then divided into I and Q components using mixers 401 and 402, oscillator 403, and a 90° phase shifter 404. The I and Q signals are filtered in low pass filters 405 and 406. The filtered signals are then combined in mixer 407 and output to transform matrix 307. The I and Q signals are also coupled to means delay 408 where a delay of one chip time can be added. The delayed signals are then combined in mixer 409 and the output provided to transform matrix 307.

Figure 5:
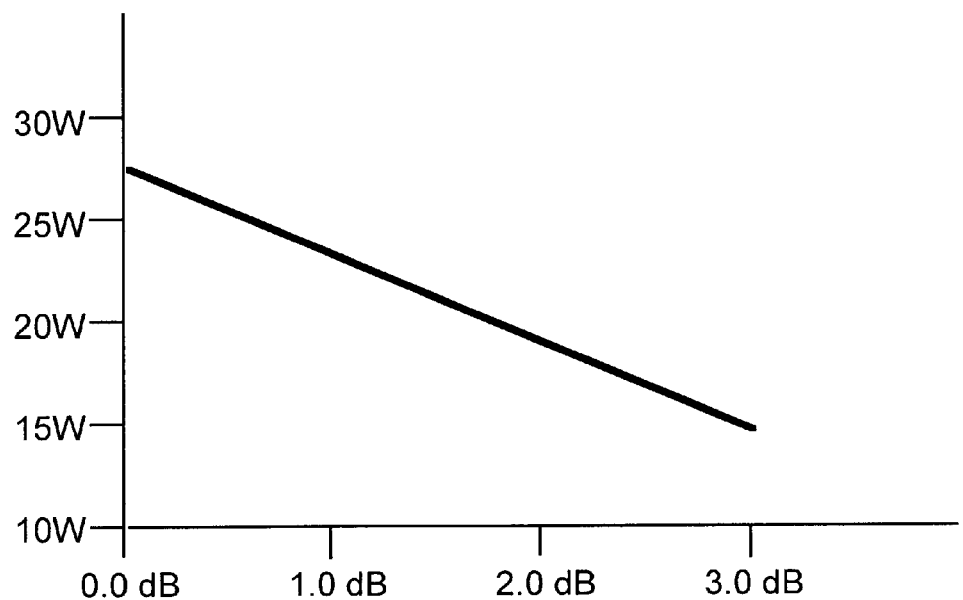
FIG. 5 is graphical representation of the power dissipation versus the transmit diversity improvements obtainable when utilizing the present invention.

As discussed previously, the use of transmit diversity permits the transmit power of the individual signals to be reduced. This provides an increase in the link margin of approximately 3.0 dB. A graph of the power amplifier dissipation versus the transmit diversity improvement is shown in FIG. 5. If the power amplifier dissipation is reduced from 27 W to 15 W, the margin link improves by 3 dB. This type of increase in the link margin can be used to increase the cell sizes which results in less equipment required on a system wide basis. This can provide substantial saving to a system operator.

Figure 6:
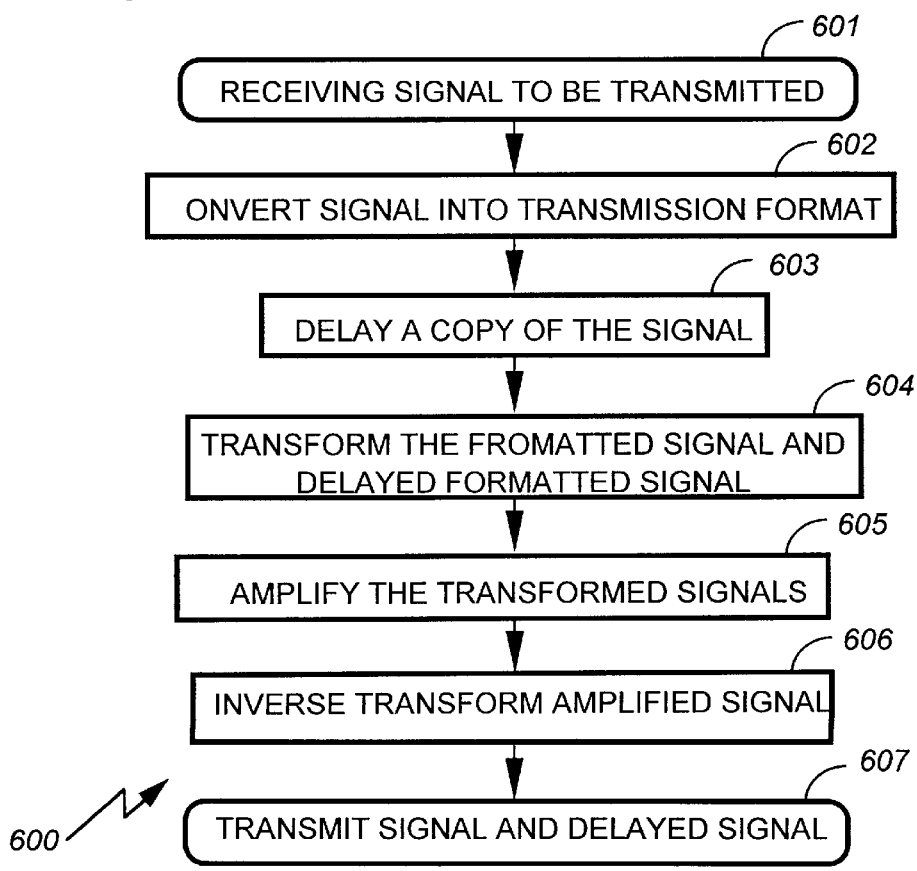
FIG. 6 is a flow chart of a method of operation of the systems of FIGS. 2 or 3.

Referring now to FIG. 6, a flow chart of a method, generally designated 600, of operation of the systems of FIGS. 2 or 3 is illustrated. Method 600 commences at step 601 when a signal to be transmitted is received. The signal is then converted into a transmission format, step 602. A copy of the signal is then delayed, step 603, by approximately 1 chip time. The formatted signal and delayed formatted signals are transformed, step 604, into statistically average signals. The transformed signals are then amplified, step 605. The amplified signals are inverse transformed, step 606, to recombine the original signals. The signals and delayed signals are then transmitted, step 607. This provides at least two signals to a receiver on which multi-path signal processing may be conducted to extract the original signal.

The above described apparatus and method provides for transmit diversity in a wireless communication system.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. An apparatus for providing transmit diversity in a wireless communication system, said apparatus comprising:

transmitting means having an output for providing a signal to be transmitted;

delay means for delaying said signal and providing a delayed signal;

transforming means for transforming said signal and said delayed signal into at least a first and a second transformed signals;

a plurality of amplifying means for amplifying said first and second transformed signals; and inverse transform means for transforming said first and second transformed signals received from said plurality of amplifying means into a modified signal and a modified delayed signal.

2. The apparatus of claim 1 wherein said wireless communication system is a code division multiple access communication system.

3. The apparatus of claim 1 wherein said delay means is a radio frequency, RF, delay means for delaying an RF representation of the signal.

4. The apparatus of claim 1 wherein said delay means is a digital delay means for delaying a digital representation of the signal.

5. The apparatus of claim 1 wherein said transforming means is a statistical averaging device.

6. The apparatus of claim 5 wherein said statistical averaging device is one of a Fourier Transform Matrix and a Butler Transform Matrix.

7. The apparatus of claim 1 wherein said first and second transformed signals each have components of said signal and said delayed signal.

8. The apparatus of claim 1 wherein each of said plurality of amplifying means comprises a single tone amplifier.

9. The apparatus of claim 1 wherein said inverse transform means comprises an inverse statistical averaging device.

10. The apparatus of claim 9 wherein said inverse statistical averaging device is one of an inverse Fourier Transform Matrix and a inverse Butler Transform Matrix.

11. An apparatus for providing transmit diversity in a wireless communication system, said apparatus comprising:

a plurality of radios, each having an input and an output, said inputs being coupled to receive a signal to be transmitted;

a plurality of delays, each having an input coupled to an output of one of said plurality of radios and an output;

a Fourier transform matrix having a plurality of inputs and a plurality of outputs, a first portion of said plurality of inputs being coupled to the outputs of said plurality of radios and a second portion of said plurality of inputs being coupled to said outputs of said delays;

a plurality of amplifiers, each having an input and an output, said inputs being coupled to said plurality of outputs of said Fourier transform matrix;

an inverse Fourier transform matrix having a plurality of inputs and a plurality of outputs, said plurality of inputs being coupled to said outputs of said plurality of amplifiers; and a plurality of antennas coupled to said plurality of outputs of said inverse Fourier transform matrix.

12. The apparatus of claim 11 wherein said wireless communication system is a code division multiple access communication system having a plurality of sectors, each sector having at least two antennas of said plurality of antennas.

13. The apparatus of claim 11 wherein a first antenna of said at least two antennas is coupled to transmit a signal output from at least one of said plurality of radios and a second antenna of said at least two antennas is coupled to transmit a signal output from at least one of said plurality of delays.

14. The apparatus of claim 11 wherein said plurality of inputs of said Fourier transform matrix is at least eight inputs, three of said at least eight inputs being coupled to said outputs of said plurality of radios and three of said at least eight inputs being coupled to said outputs of said plurality of delays.

15. The apparatus of claim 14 wherein two of said at least eight inputs of said Fourier transform matrix are each coupled to a load.

16. The apparatus of claim 11 wherein said plurality of outputs of said inverse Fourier transform matrix has at least eight outputs, two of said at least eight outputs each being coupled to a load.

17. An apparatus for providing transmit diversity in a wireless communication system, said apparatus comprising:

a first plurality of radios, each having an input and an output, said inputs being coupled to a signal to be transmitted;

a second plurality of radios, each having an input, an output and a delay associated therewith, said inputs being coupled to said signal to be transmitted;

a Fourier transform matrix having a plurality of inputs and a plurality of outputs, a first portion of said plurality of inputs being coupled to the plurality of outputs of said first plurality of radius and a second portion of said plurality of inputs being coupled to said second plurality of radios;

a plurality of amplifiers, each having an input and an output, said inputs being coupled to said plurality of outputs of said Fourier transform matrix;

an inverse Fourier transform matrix having a plurality of inputs and a plurality of outputs, said plurality of inputs being coupled to said plurality of outputs of said plurality of amplifiers; and a plurality of antennas coupled to said plurality of outputs of said inverse Fourier transform matrix.

18. A method of providing transmit diversity in a wireless communication system, said method comprising the steps of:

receiving a signal to be transmitted;

delaying a copy of said signal, forming a delayed signal;

transforming said signal and said delayed signal into first and second transformed signals, said first and second transformed signals each containing a portion of said signal and said delayed signal;

amplifying said first and second transformed signals, forming a first and a second amplified signal;

inverse transforming said first and second amplified signals forming a fist transmit signal derived from said signal and a second transmit signal derived from said delayed signal.

19. The method of claim 18 further comprising the step of converting said signal into a transmission format prior to said step of delaying a copy of said signal.

20. The method of claim 18 further comprising the step of converting said signal and said delayed signal into a transmission format prior to said step of transforming said signal and said delayed signal.

* * * * *